UNITED STATES PATENT OFFICE.

FREDERIC A. EUSTIS, OF MILTON, MASSACHUSETTS.

METHOD OF TREATING IRON ORE.

1,237,765.  Specification of Letters Patent.  Patented Aug. 21, 1917.

No Drawing.   Application filed January 12, 1917.   Serial No. 141,977.

*To all whom it may concern:*

Be it known that I, FREDERIC A. EUSTIS, a citizen of the United States, and resident of Milton, in the county of Norfolk and State of Massachusetts, have invented new and useful Improvements in Methods of Treating Iron Ore, of which the following is a specification.

This invention relates to the treatment of an iron ore or iron bearing material (referred to hereinafter simply as ore or iron ore) which contains aluminum compound or compounds, and which may also contain one or more of the metals nickel, cobalt, manganese and chromium (referred to hereinafter as incidental metals); the treatment being for the purpose of extracting or recovering the aluminum compound or compounds, and also the incidental metals if present, in the form of valuable commercial products while at the same time improving the quality of the ore.

The process is peculiarly, though not exclusively, adapted to the treatment of such ores as the soft iron ores on the north coast of the island of Cuba, which occur as blanket deposits on top of the rocks forming that part of the island. These ores consist essentially of oxids or oxids and silicates of iron and aluminum, and contain also small amounts of the metals nickel, cobalt, manganese and chromium, together with much water.

In my former Patent No. 1,212,334, granted January 16, 1917, to which reference is hereby made for fuller details, I set forth a process of recovering nickel, alumina and other metals or their compounds from such ores by a so-called "wet method," which includes subjecting the ore in its raw state to a sulfating roast, as by roasting the ore mixed with a small proportion of sulfur-bearing material such as pyrite, to make a relatively large amount of the incidental metals soluble, but only a relatively small amount of the iron and gangue soluble. Thereafter the metallic compounds are dissolved and precipitated. And in my former application Serial No. 96,050, filed May 8, 1916, also relating to a wet method, to which reference is hereby made for further details, I set forth a process of subjecting the ore to a sulfating roast by heating the material in the presence of an atmosphere containing an excess of sulfur dioxid gas; after which the metals are dissolved and precipitated.

While these methods are effective and satisfactory, I have discovered through further research and experimentation that the process and the product are improved and economies effected by removing the aluminum compounds, or at least a substantial part of them, from the ore before subjecting it to the sulfating roast.

The element aluminum because of its small atomic weight and valence of three, requires a very large amount of sulfur to sulfate it, for example, theoretically 1.78 pounds for every pound of alumina, and also requires a very large amount of precipitant to precipitate it, the amount of sodium sulfid, for example, if sodium sulfid be used for a precipitant, amounting to two and one-half times the weight of the oxid of aluminum thrown down. By removing the aluminum compounds, or an important part of them, say 50%, before performing the sulfating, the amount of reagents required for the recovery of the incidental metals is correspondingly reduced, and the cost of the process is thereby similarly reduced. Furthermore, when some alumina is removed before the roast, and some as always by the roast and subsequent leach, the total extraction of alumina is much greater than in the processes described in my said earlier patent and application, and the iron ore residue is thus much improved because it contains a less percentage of alumina and a higher percentage of iron. The aluminum may be obtained as an oxid or as a hydrate, or in other form that lends itself to use in the arts, and may be a valuable product. Indeed, the conception that such an iron bearing material may be treated as a double ore of aluminum and of the other metals by the use of chemical reagents adapted to the separation of two products each bettered from the point of view of its ultimate treatment, may have a very large result in the arts.

The removal of the aluminum compounds from the iron ore, whether the ore contains incidental metals or not, makes easier the subsequent treatment of the ore to produce pig iron and steel by reducing the amount of slag that must be made and by enabling the furnace operator to produce a less troublesome slag with less flux and with less fuel.

In carrying out the process the aluminum compounds may be removed from the ore before sulfating by simply boiling the ore in a solution of sodic hydrate or potassic hydrate, preferably a strong solution, which causes the aluminum compounds to go into solution. This solution can be drained from the ore leaving the latter after suitable washing ready for sulfating. The aluminum compounds may be in turn precipitated from the solution by simply diluting the solution and stirring into the solution a large amount of aluminum hydrate which has the advantage of leaving the sodic or potassic hydrate suitable to use again. Or the aluminum compounds may be thrown down by a suitable reagent such, for instance, as mineral acid. With some ores it will be found desirable to heat with sodium carbonate to assist in taking the aluminum compounds into solution. With other ores it may be desirable to carry on the alkali treatment under pressure. To those skilled in metallurgy suitable methods of performing this step of making soluble the aluminum compounds in particular ores, will readily suggest themselves.

Such treatments will in general not make soluble all the aluminum compounds, and the balance will remain in the ore and be sulfated during the succeeding steps of the process, and a portion of such balance will thus be removed and recovered.

After the aluminum compounds have been in whole or in part removed the product may be subjected to a sulfating roast, which is to be carefully distinguished from smelting, to render a relatively large amount of the incidental metals soluble while leaving the iron in the main insoluble. The incidental metals are thereafter dissolved and then precipitated from the solution as described in my said former patent and application. The iron bearing residue, in which the alumina content is now greatly reduced, containing less than one-half of what it did originally, is available for use in the blast furnace, and may be smelted with the advantages above pointed out, the substantial absence of aluminum compounds enabling pig iron and steel to be produced with a less amount of slag, a less troublesome slag, less flux and less fuel.

More specifically, the sulfating roast treatment may be carried on at a moderate temperature in a muffle. It is desirable to add to the ore 5% to 10% of its weight of a sulfur-bearing material, such as pyrite, roasting the mixture at a temperature of about 460° C. for a period of about four hours or more. As a result of this heat treatment a large proportion of the incidental metals are made into sulfate while only a small proportion of the iron is made into sulfate. Thus, the process makes a large proportion of incidental metals soluble and only a small proportion of iron soluble. After the sulfating roast, the product of the roast is subjected to a leaching treatment either in water or in dilute (say 2%) sulfuric acid. The incidental metal will readily go into solution in the water or dilute acid. It is also desirable to use the solvent boiling hot, that is, at a temperature of about 100° C. since iron is less soluble in a hot solution, whereas the incidental metals are more soluble.

Instead of conducting a sulfating roast in the manner just described, the ore first thoroughly dried, may be placed finely broken up in a suitable furnace into which sulfur dioxid gas preferably mixed with a small amount of air is admitted while the heating is being performed. The material is heated at a temperature preferably of about 460° C. under conditions which insure the treatment of the ore in an atmosphere containing an excess of sulfur dioxid gas.

Whichever form of sulfating roast is employed, after having gotten the incidental metals into solution the sulfate solution is subjected to precipitation treatment by any well known or desired method. If several metals are to be recovered they may be precipitated in turn. The specific form of sulfating roast and the specific leaching and precipitation steps are not essential to the present invention.

As already stated, the process is especially adapted to the treatment of iron ores having the characteristics of the Cuban ore above referred to, but the process can also be used to good advantage in the treatment of iron ores containing aluminum but not other incidental metal. Or for some reason it may be desirable to disregard the incidental metals even though present, in Cuban or other ores. In such cases the aluminum compounds will be first removed, or substantially removed, as described, and thereafter the iron bearing residue whose content of aluminum compounds has been greatly lessened may be smelted without performing the intermediate sulfating roasting step; the objects thus attained being the production of a material valuable in itself, namely, alumina or aluminum compounds, and at the same time an iron ore materially improved for smelting. When the incidental metals are to be recovered also, a part of the aluminum compounds may be first removed, as described, and then the iron ore with the residue of the aluminum compounds may be subjected to the sulfating roast to recover the balance of the aluminum compounds and the incidental metals. One advantage of this latter method is that certain aluminum compounds can be first removed, as by one of the processes above mentioned, much more cheaply than by the subsequent sulfating roast, while aluminum compounds which cannot be removed from silicates by the first step can be removed by the sulfating roast. The results will be the recovery of aluminum compounds and incidental metals in valuable commercial form, and an ore which is itself materially improved for smelting.

I claim:

1. The method of treating an iron ore containing aluminum compounds and one or more incidental metals such as nickel, cobalt, manganese or chromium, which comprises first removing from the ore the whole or a substantial part of the aluminum compounds, and thereafter subjecting the remaining ore to a sulfating roast adapted to render soluble a large proportion of such incidental metals, while rendering only a small proportion of the iron soluble.

2. The method of treating an iron ore containing aluminum compounds and one or more of the incidental metals nickel, cobalt, manganese or chromium, which comprises first removing from the ore the whole or a substantial part of the aluminum compounds, thereafter subjecting the remaining ore to a sulfating roast adapted to render soluble a large proportion of such incidental metals, while rendering only a small proportion of the iron soluble, and thereafter recovering one or more of such incidental metals from the solution.

3. The method of treating an iron ore containing aluminum compounds and one or more of the incidental metals nickel, cobalt, manganese or chromium, which comprises first removing from the ore a part of the aluminum compounds, and thereafter subjecting the remaining ore to a sulfating roast adapted to render soluble a large proportion of such incidental metals and a part of the remaining aluminum compounds, while rendering only a small proportion of the iron soluble, and thereafter recovering in useful form one or more of such incidental metals and also the dissolved aluminum compounds from the solution.

4. The method of treating an iron ore containing aluminum compounds and one or more of the incidental metals nickel, cobalt, manganese or chromium, which comprises first removing from the ore the whole or a substantial part of the aluminum compounds, thereafter subjecting the remaining ore to a sulfating roast adapted to render soluble a large proportion of such incidental metals, while rendering only a small proportion of the iron soluble, thereafter recovering one or more of such incidental metals from the solution, and thereafter smelting the iron bearing residue.

5. The method of treating an iron ore containing aluminum compounds which comprises first removing from the ore the whole or a substantial part of the aluminum compounds by suitable chemical reagents acting thereon, and thereafter smelting the iron bearing residue.

6. The method of treating an iron ore containing aluminum compounds, which comprises first removing from the ore a part of the aluminum, thereafter subjecting the remaining ore, with the balance of the aluminum compounds, to a sulfating roast to render soluble a large proportion of the balance of the aluminum compounds, while rendering only a small proportion of the iron soluble, and thereafter recovering the dissolved aluminum compounds.

7. The method of treating an iron ore containing aluminum compounds, which comprises first removing from the ore a part of the aluminum compounds, thereafter subjecting the remaining ore, with the balance of the aluminum compounds, to a sulfating roast to render soluble a large proportion of the balance of the aluminum compounds, while rendering only a small proportion of the iron soluble, thereafter recovering the dissolved aluminum compounds, and thereafter smelting the iron bearing residue.

8. The method of treating an iron ore containing aluminum compounds which comprises removing from the ore the whole or a substantial part of the aluminum compounds in valuable form by chemical reagents adapted to extract the aluminum compounds from the ore without substantial extraction of the other metallic content, thus leaving the other metallic content of the ore comparatively aluminum free, whereby its condition for smelting is substantially improved.

9. The method of treating an iron ore containing aluminum compounds which comprises removing from the ore the whole or a substantial part of the aluminum compounds in valuable form by chemical reagents adapted to extract the aluminum compounds from the ore without substantial extraction of the other metallic content, thus leaving the other metallic content of the ore comparatively aluminum free, whereby its condition for smelting is substantially improved, and thereafter smelting the iron bearing residue.

Signed by me at New York city, New York, this tenth day of January, 1917.

FREDERIC A. EUSTIS.